United States Patent
Cholewo et al.

(10) Patent No.: US 6,867,883 B1
(45) Date of Patent: Mar. 15, 2005

(54) METHOD AND APPARATUS FOR EXPANDING A COLOR GAMUT

(75) Inventors: Tomasz Jan Cholewo, Lexington, KY (US); Raymond Edward Clark, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/489,226

(22) Filed: Jan. 21, 2000

(51) Int. Cl.[7] .................................................. H04N 1/60
(52) U.S. Cl. ..................... 358/1.9; 358/518; 358/520
(58) Field of Search ........................ 358/1.9, 518, 523, 358/529, 1.16, 3.01, 519, 520, 521, 522; 382/167

(56) References Cited

U.S. PATENT DOCUMENTS

| | | | |
|---|---|---|---|
| 4,590,515 A | 5/1986 | Wellendorf | 358/75 |
| 5,077,604 A | 12/1991 | Kivolowitz et al. | 358/75 |
| 5,243,414 A | 9/1993 | Dalrymple et al. | 358/500 |
| 5,268,754 A | 12/1993 | Van de Capelle et al. | 358/527 |
| 5,270,808 A | 12/1993 | Tanioka | 358/527 |
| 5,329,385 A | 7/1994 | Washio | 358/515 |
| 5,463,480 A | 10/1995 | MacDonald | 358/520 |
| 5,481,655 A * | 1/1996 | Jacobs | 358/1.9 |
| 5,515,172 A | 5/1996 | Shiau | 358/298 |
| 5,528,386 A * | 6/1996 | Rolleston et al. | 358/522 |
| 5,553,199 A | 9/1996 | Spaulding et al. | 395/109 |
| 5,559,604 A | 9/1996 | Arai | 356/402 |
| 5,581,376 A | 12/1996 | Harrington | 358/518 |
| 5,612,795 A | 3/1997 | Dichter | 358/518 |
| 5,650,942 A | 7/1997 | Granger | 364/526 |
| 5,659,406 A | 8/1997 | Imao et al. | 358/518 |
| 5,673,335 A | 9/1997 | Ohta et al. | 382/167 |
| 5,710,824 A | 1/1998 | Mongeon | 382/162 |
| 5,724,442 A | 3/1998 | Ogatsu et al. | 382/167 |
| 5,737,088 A | 4/1998 | Coleman | 358/296 |
| 5,742,410 A | 4/1998 | Suzuki | 358/518 |
| 5,745,263 A | 4/1998 | Oryo | 358/518 |
| 5,764,795 A | 6/1998 | Takeo et al. | 382/167 |
| 5,774,238 A | 6/1998 | Tsukada | 358/529 |
| 5,787,193 A | 7/1998 | Balasubramanian | 382/167 |
| 5,857,063 A | 1/1999 | Poe et al. | 395/109 |
| 5,883,632 A | 3/1999 | Dillinger | 345/431 |
| 5,978,011 A * | 11/1999 | Jacob et al. | 347/251 |
| 5,987,168 A * | 11/1999 | Decker et al. | 382/167 |
| 5,999,703 A * | 12/1999 | Schwartz et al. | 358/1.9 |
| 6,043,909 A * | 3/2000 | Holub | 358/504 |
| 6,185,004 B1 * | 2/2001 | Lin et al. | 358/1.9 |
| 6,307,644 B1 * | 10/2001 | Ohta | 358/1.9 |
| 6,330,076 B1 * | 12/2001 | Imaizumi et al. | 358/1.9 |
| 6,330,078 B1 * | 12/2001 | Wang | 358/1.9 |
| 6,362,808 B1 * | 3/2002 | Edge et al. | 345/601 |
| 6,386,670 B1 * | 5/2002 | Huang et al. | 347/15 |
| 6,396,595 B1 * | 5/2002 | Shimazaki | 358/1.9 |
| 6,421,142 B1 * | 7/2002 | Lin et al. | 358/1.9 |
| 6,501,563 B1 * | 12/2002 | Sato et al. | 358/1.9 |
| 6,542,634 B1 * | 4/2003 | Ohga | 382/167 |
| 6,567,186 B1 * | 5/2003 | Jacob et al. | 358/1.9 |
| 2002/0113982 A1 * | 8/2002 | Chang et al. | 358/1.9 |

* cited by examiner

Primary Examiner—Scott A. Rogers
(74) Attorney, Agent, or Firm—John A. Brady

(57) ABSTRACT

A color gamut in a first color space is expanded to utilize a larger gamut in a second color space. The gamut in the first color space is first converted by black generation or geometric distortion to a gamut in a second color space. The gamut in the second color space is converted by forward mapping to a gamut in a third color. The gamut in the third color space is expanded by linear rescaling. Finally, the linearly rescaled gamut is mapped to a gamut in the second color space through inverse modeling to form a final color gamut. The final color gamut utilizes the gamut available in the second color space, which is larger than the gamut available in the first color space.

7 Claims, 6 Drawing Sheets

METHOD AND APPARATUS FOR EXPANDING A COLOR GAMUT

FIELD OF THE INVENTION

This invention relates to color printing, and more particularly, to the use of colorants and gamut scaling in color printing.

BACKGROUND OF THE INVENTION

Combinations of the colorants cyan, magenta, and yellow (CMY) are capable of producing images containing colors in the visible spectrum, so many color imaging systems are designed around CMY colorants. To improve image quality and to reduce the costs of printing, black is sometimes added to a CMY color gamut to form a CMYK (cyan, magenta, yellow, and black) color gamut. The visual details of an image rendered from a CMYK color gamut are sharper than the visual details of the same image rendered from a CMY color gamut. Similarly, the gray balance of an image rendered from a CMYK color gamut is better than the gray balance of an image rendered from a CMY color gamut. So, many modern color imaging systems utilize the colorants cyan, magenta, yellow, and black (CMYK) in forming color images.

Most conversion methods from CMY to CMYK simultaneously add black colorant and reduce the amounts of cyan, magenta, and yellow. One popular solution is based on a combination of Under Color Removal (UCR) and Black Generation (BG) functions:

$$PK = \min(C, M, Y)$$

$$C_1 = C - UCR(PK)$$

$$M_1 = M - UCR(PK)$$

$$Y_1 = Y - UCR(PK)$$

$$K_1 = BG(PK) \quad (1)$$

where (C, M, Y) are input values and ($C_1$, $M_1$, $Y_1$, $K_1$) are the output values. The black generation function computes the black colorant amount based on the process black amount P. The CMY values are reduced by an amount dependent on PK. However, such a simple transformation does not preserve colorimetric relations and does not allow use of the whole printer gamut.

Unfortunately, even though each of these processes show improved gray balance in images rendered from a CMYK color space when compared with images rendered from a CMY color space, each of these processes also has some disadvantages. One disadvantage is that the UCR and GCR processes are not based on human visual perception and therefore fail to faithfully reproduce the original image. A second disadvantage of most CMYK systems is that they fail to utilize the entire gamut of the CMYK color space. Failing to utilize the entire gamut results in a suboptimal rendering of a CMY image in a CMYK color space.

For these and other reasons there is a need for the present invention.

SUMMARY OF THE INVENTION

The above mentioned problems with generating a CMYK color gamut from a CMY color gamut are addressed by the present invention, which will be understood by reading and studying the following specification.

In one embodiment, a gamut in a first color space is converted to a gamut in a second color space. The gamut in the second color space is converted to a gamut in a third color space. A lightness component of a gamut value in the third color space is rescaled to form a modified gamut. Finally, the modified gamut is converted to a second gamut in the second color space. In an alternate embodiment, rescaling a lightness component of a gamut value in the third color space to form a modified gamut comprises modifying the gamut in the third color space by changing a lightness component of the gamut value in the third color space such that an upper surface of the gamut in the first color space is preserved and a lower surface of the gamut in the first color space is mapped to a bottom surface of the gamut of the second color space to form an expanded gamut in the third color space.

In another embodiment, a gamut in a CMY color space having an upper surface and a lower surface is converted to a gamut in a CMYK color space having a bottom surface. The gamut in the CMYK color space is converted to a gamut in a CIELAB color space and the gamut in the CIELAB color space has a lightness component. The gamut in the CIELAB color space is modified by changing the lightness component such that the upper surface of the gamut in the CMY color space is preserved and the lower surface in the CMY color space is mapped to the bottom surface of the gamut of the CMYK color space to form a gamut in an expanded CIELAB color space. Finally, the gamut in the expanded CIELAB color space is transformed to form a second gamut in the CMYK color space. In an alternate embodiment, a CIELAB gamut having an L* component is modified to form a modified CIELAB gamut, and the modified CIELAB gamut is converted to a color control space gamut subject to K constraints and Total Area Coverage (TAC) constraints. In another alternate embodiment, the CIELAB gamut is modified to form a modified CIELAB gamut and the method comprises linearly rescaling the L* component of the CIELAB gamut to form the modified CIELAB gamut.

In another embodiment, a method comprises obtaining a CIELAB space gamut from a CMYK space gamut obtained from a CMY space gamut, expanding the CIELAB space gamut by changing the lightness component of the CIELAB space gamut, and transforming the CIELAB space gamut into a second CMYK space gamut. In an alternate embodiment, changing the lightness component of the CIELAB space gamut comprises linearly rescaling the lightness component of the CIELAB space gamut. In another alternate embodiment, linearly rescaling the lightness component in the CIELAB space gamut comprises computing a rescaling factor that is a function of an $L_{min}$, an $L_{max}$, and an $L_{mincmy}$.

In another embodiment, an apparatus for transforming a CMY color space gamut into a CMYK color space gamut comprises a processing unit, a memory unit coupled to the processing unit, and a software means operative on the processing unit. The software means is operative on the processing unit for obtaining an CIELAB space gamut from a first CMY space gamut. The CIELAB space gamut has a plurality of values and each of the plurality of values has a lightness component. After obtaining a CIELAB space gamut from a first CMY space gamut, the software means is operative for expanding the CIELAB space gamut by changing the lightness component of at least one of the plurality of values of the CIELAB space gamut and transforming the CIELAB space gamut into the CMYK space gamut.

In another embodiment, a computer-readable medium has computer-executable instructions for performing a method.

The method comprises first obtaining a CIELAB space gamut having a lightness component. The CIELAB space gamut is obtained from a CMYK space gamut which is obtained from a CMY space gamut. Second, the method comprises expanding the CIELAB space gamut by linearly rescaling the lightness component in the CIELAB space gamut using an $L_{min}$, an $L_{max}$, and an $L_{mincmy}$. Finally, the method comprises transforming the CIELAB space gamut into a second CMYK space gamut.

DETAILED DESCRIPTION OF THE INVENTION

The present invention provides a method for relating a three-dimensional CMY coordinate system to CMYK colorant amounts in a way that increases the utilization of a printer gamut volume. A printer gamut, in one embodiment, is an arbitrary set of colors. In general, adding a black colorant to any combination of CMY colorants does not result in a color with more chroma. Therefore, a CMYK gamut can be obtained from a CMY gamut by expanding the CMY gamut towards lower lightness values. Use of black colorant on the gray axis is enforced by modifying the initial distribution of CMY points through an approximate black generation transform. Lightness values of a resulting set of points in CIELAB space are scaled to fill the four-color gamut volume. The CMYK values corresponding to the modified CIELAB colors are found by inverting a printer model. This last process determines a specific black use rate which can depend on the region of the color space.

Figure 1:
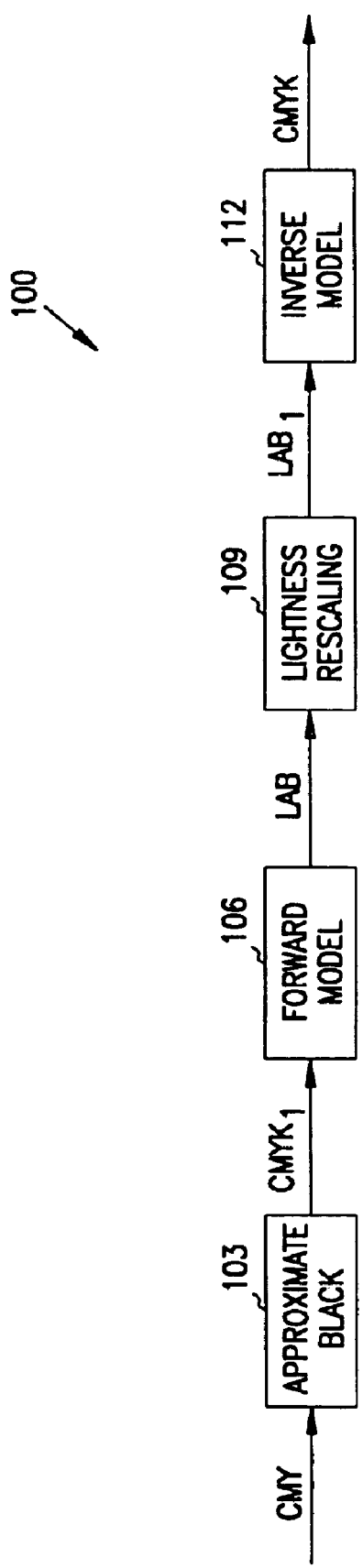
FIG. 1 is a flow diagram of example embodiments of a method for black generation using lightness scaling.

FIG. 1 is a flow diagram of one embodiment of method 100 for black generation using lightness scaling. Black generation method 100 converts a CMY color space to a CMYK color space and includes black approximation process 103 for converting the CMY color space to a $CMYK_1$ color space. Black approximation process 103 is followed by forward model process 106 for converting the $CMYK_1$ color space to a CIELAB color space. The CIELAB color space is converted by lightness scaling process 109 to a $Lab_1$ color space. Finally, inverse model process 112 converts the $Lab_1$ color space to a CMYK color space.

In black approximation process 103, an approximate conversion from a CMY color space to a $CMYK_1$ color space is performed. Colors corresponding to output values generated by this conversion are within the original CMY gamut chroma boundaries. In addition, color values corresponding to the upper surface of the printer gamut are left unmodified, i.e.:

$C_1=C, M_1=M, Y_1=Y, Y, K_1=0$, if min$(C,M,Y)=0$ and $K=0$.

In one embodiment of black approximation process 103, a K=0 component is added. In an alternate embodiment, to impose a condition that balanced CMY values be converted to black:

$C_1=M_1=Y_1=0, K_1=C$, if $C=M=Y$.

All the above conditions are satisfied by a black generation method known as achromatic reproduction, which is obtained from Equation (1) when BG(x)=x and UCR(x)=x.

$K_1=\min(C,M,Y)$ $C_1=C-K_1$ $M_1=M-K_1$ $Y_1=Y-K_1$.

The final a* and b* coordinates of colors on ramps from black to primary and secondary colors are also implicitly defined in black approximation 103. By using nonlinear modifications of the above formula, desired colorant behavior can be obtained.

In one embodiment of forward model process 106, CIELAB values corresponding to the $CMYK_1$ values are obtained by printing and measuring a set of patches on a printer. In an alternate embodiment, CIELAB values are obtained from the CMYK, values by processing the $CMYK_1$ values using a printer model. A printer model is flexible and avoids the time and expense required to print and remeasure the patches when the black function is changed. A number of different techniques can be used for implementing a printer model. For example, a printer mode can be implemented as Neugebauer equations, lookup tables with interpolation, neural networks, fuzzy logic, or a polynomial regression.

In lightness rescaling process 109, the CIELAB point distribution is modified by changing the lightness components in such a way that the upper surfaces of the CMY gamut are preserved and the lower surfaces are mapped to the bottom surface of the full CMYK gamut. For each point obtained in forward model process 106, three corresponding points with identical a* and b* coordinates are identified. One of the points is located on the top surface of the CMYK gamut, which is identical to the top surface of the CMY gamut. The lightness of this point is denoted by $L^*_{max}$. The other two points are located on the bottom surfaces of the CMY and CMYK gamuts and have lightness $L^*_{mincmy}$ and $L^*_{min}$, respectively. If black is not the darkest point in the gamut, to avoid non-monotonic behavior in some regions of the transform, the values of $L^*_{min}$ can be clipped to not less than L* of black. In one embodiment, the modified L* values are found by expanding the lightness range by linear resealing:

$$L_1^* = \begin{cases} \dfrac{L^*_{min} + (L^* - L^*_{mincmy})(L^*_{max} - L^*_{min})}{(L^*_{max} - L^*_{mincmy})} & \text{if } L^*_{max} - L^*_{mincmy} \neq 0 \\ L^* & \text{otherwise.} \end{cases}$$

Figure 2:
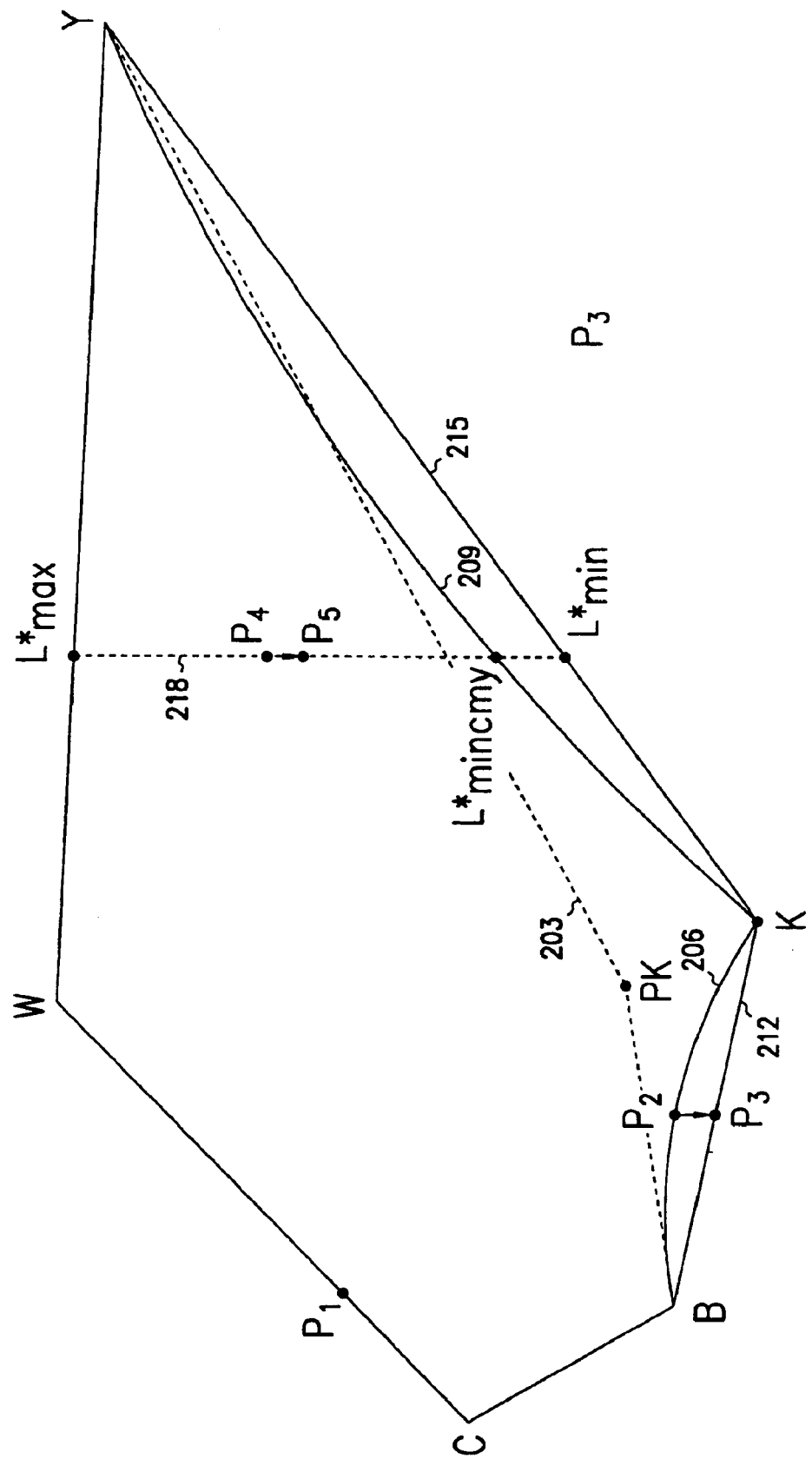
FIG. 2 is a diagram and a visualization of the lightness rescaling process in the CIELAB space.

A diagram and visualization of the lightness rescaling process is shown in FIG. 2.

In one embodiment of the present invention, a geometric method is used to determine the $L^*_{min}$, $L^*_{max}$ and $L^*_{mincmy}$ values. In an alternate embodiment, a constrained optimization method is used to determine the $L^*_{min}$, $L_{max}$ and $L^*_{mincmy}$ values. Neither of these embodiments is based on assumptions about the way CMY sub-gamuts for different values of K overlap and work in the presence of natural gamut boundaries.

Figure 3:
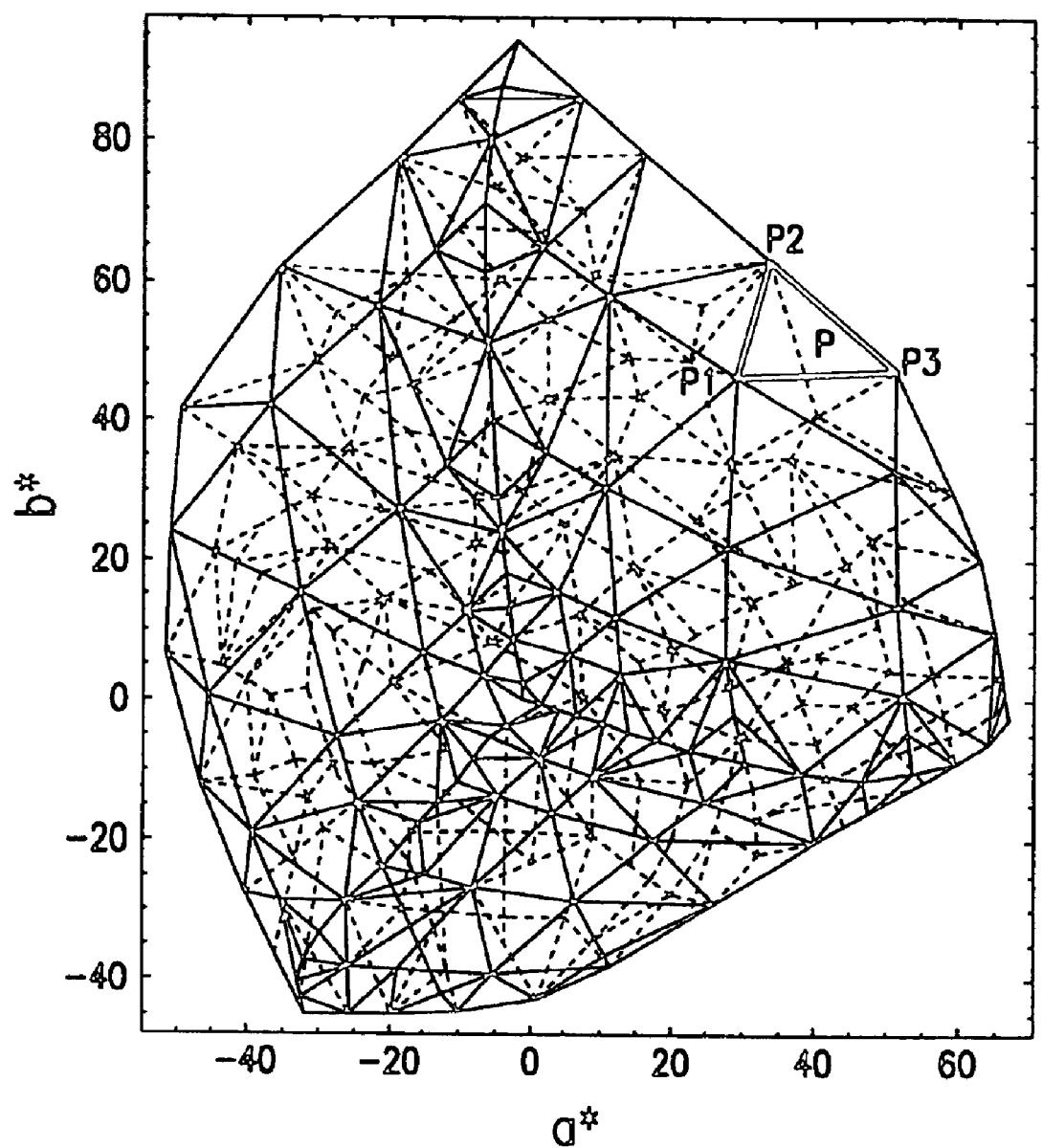
FIG. 3 is a projection for a color inkjet printer gamut surface.

The geometric method uses alpha shapes to determine the description of the gamut boundaries in the form of surfaces composed of triangles. The intersections of the lines of constant (a*, b*) with the top surface of the CMYK gamut and the bottom surfaces of CMYK and CMY gamuts are found. A search for triangles which are intersected by this line is performed after the L* coordinates are ignored by projecting all the triangles onto the a*b* plane. FIG. 3 shows such a projection for a color inkjet printer gamut surface. The solid and dashed lines correspond to the top and bottom gamut surfaces, respectively. Planar barycentric coordinates of a point (a*, b*) with respect to a triangle $P_1P_2P_3$ where $P_i=(L_i, a^*_i, b^*_i)$ are given by:

$$u=[(a^*_2-a^*)(b^*_3-b^*)-(a^*_3-a^*)(b^*_2-b^*)]/A$$

$$v=[(a^*_3-a^*)(b^*_1-b^*)-(a^*_1-a^*)(b^*_3-b^*)]/A$$

$$w=[(a^*_1-a^*)(b^*_2-b^*)-(a^*_2-a^*)(b^*_1-b^*)]/A$$

where A is the area of the triangle under consideration:

$$A=(a^*_2-a^*_1)(b^*_3-b^*_1)-(a^*_3-a^*_1)(b^*_2-b^*_1).$$

The line of constant (a*, b*) intersects a triangle if each of the coordinates (u, v, w) is greater than or equal to zero. Assuming that the gamut shape is sufficiently regular, for each (a*, b*) within the gamut chroma limits there will be two triangles like that: one on the top and one of the bottom surface of the gamut. The L* value for each of the intersection points is then computed from the weighted sum:

$$L^*=uL_1+vL_2+wL_3.$$

Most printing processes impose a limit on the total Area Coverage (TAC), defined as the sum of the fractional areas covered by the halftone dots in the four separations. Exceeding the TAC limit is avoided by using only the points with colorant amounts less than TAC for computation of gamut surfaces.

The constrained optimization method is adapted for the purpose of finding the maximum and minimum L* values on the gamut surface by searching for the point in the gamut which is the closest to the point outside the gamut which has the same a* and b* coordinates. The color space error function is constructed by weighting the a* and b* (or chroma and hue) much more strongly than lightness, for example, by setting $S_C=S_H=1$ and $S_L=0.001$. This produces the type of gamut mapping which transforms out-of-gamut points approximately vertically to points on the gamut surface. The range of lightness values is limited by the total area coverage (TAC) constraint incorporated in the optimization process.

For inverse model process 112, the expanded CIELAB values are inverted. The inversion process is subject to specific constraints. One constraint is based on the desired relationship between K and CMY. A second constraint is based on the Total Area Coverage (TAC) limit. The TAC constraint allows the black use rate to vary with the region of the color space to which the inversion is being applied.

After the CMYK values are obtained by inverse model process 1112, the CMYK values can be smoothed. One useful smoothing kernel is based on a Laplace equation, which in the one-dimensional case (for the edges) is:

$$u_j = \frac{1}{2}(u_{j-1} + u_{j+1}) \text{ for } j = 1, \ldots, J-1,$$

where J is the number of grid points. In one embodiment, the smoothing process includes three operations. First, CMYK values for edges of the input CMY cube are smoothed, while keeping the corner values fixed. Second, the cube faces of the CMY cube are smoothed, while keeping the edges fixed. Finally, the whole cube volume is smoothed. Alternatively, smoothing can be performed by fitting a global model to the set of CMYK values and then using the fitted global model to obtain new values.

FIG. 2 is a diagram and a visualization of the lightness rescaling process in the CIELAB space. Dashed line 203 shows the bottom of the CMY gamut. Line segments 206 and 209 show the intermediate outline of the gamut after approximate black generation. Line segments 212 and 215 show an outline of the full CMYK-gamut. Vertical dashed line 218 has constant a* and b* coordinates. Point $P_1$ is not modified because it is on the upper surface of the gamut. Point $P_2$ is mapped from the bottom of the modified CMY gamut to a point $P_3$ on the bottom of the CMYK gamut. Point $P_4$ is inside the CMY gamut and is transformed to a point $P_5$ which has proportionally rescaled lightness.

Figure 4:
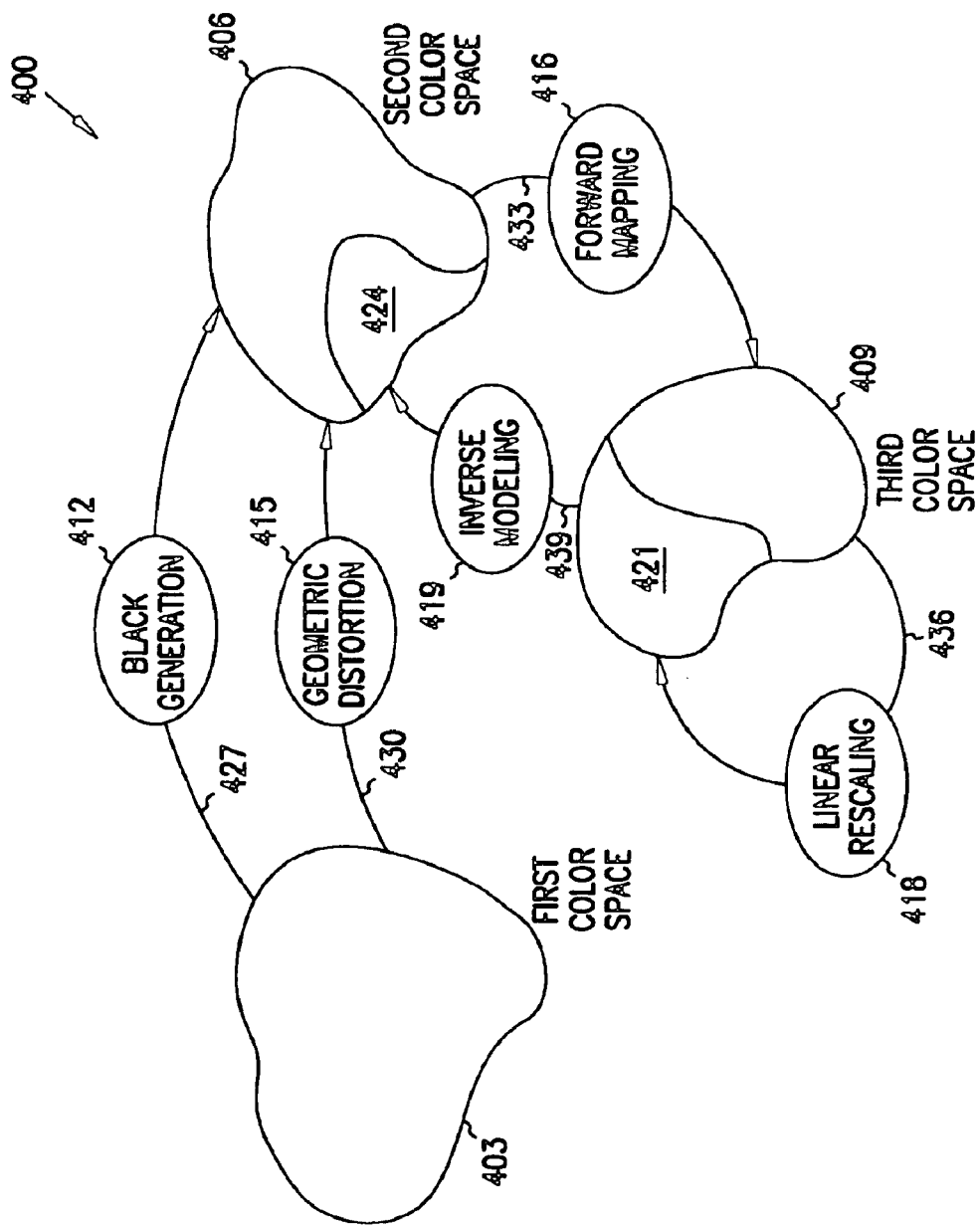
FIG. 4 is a diagram of alternate example embodiments of a method for increasing the use of a color gamut.

FIG. 4 is a diagram of alternate example embodiments of method 400 for increasing the use of a color gamut. The diagram includes first color space gamut 403, second color space gamut 406, third color space gamut 409, black generation 412, gamut distortion 415, forward mapping 416, linear rescaling 418, inverse modeling 419, modified gamut 421, and second gamut 424. The diagram also includes conversion paths 427, 430, 433, 436, and 439.

In one embodiment, first color space gamut 403 is a CMY color space gamut, second color space gamut 406 is a CMYK color space gamut, and third color space gamut 409 is a CIELAB gamut. In one embodiment of method 400, conversion path 427 employs black generation 412 in converting first color space gamut 403 to second color space gamut 406. In an alternate embodiment, conversion path 430 employs geometric distortion 415 in the process of converting first color space gamut 403 to second color space gamut 406.

After converting first color space gamut 403 to second color space gamut 406, conversion path 433 employs forward mapping 416 to convert second color space gamut 406 to third color space gamut 409. In one embodiment, forward mapping 416 includes printing color patches from second color space 406 and performing a spectral analysis of the patches. The spectral analysis provides values in third color space gamut 409 into which the values of second color space gamut 406 may be mapped. In an alternate embodiment, forward mapping 416 includes developing and employing a model to map second color space 406 to third color space 409.

After converting second color space gamut 406 to third color space gamut 409, conversion path 436 employs linear rescaling 418 to convert third color space gamut 409 to modified gamut 421.

Finally, after converting third color space gamut 409 to modified gamut 421, conversion path 439 employs inverse modeling 419 to convert modified gamut 421 to second gamut 424.

Figure 5:
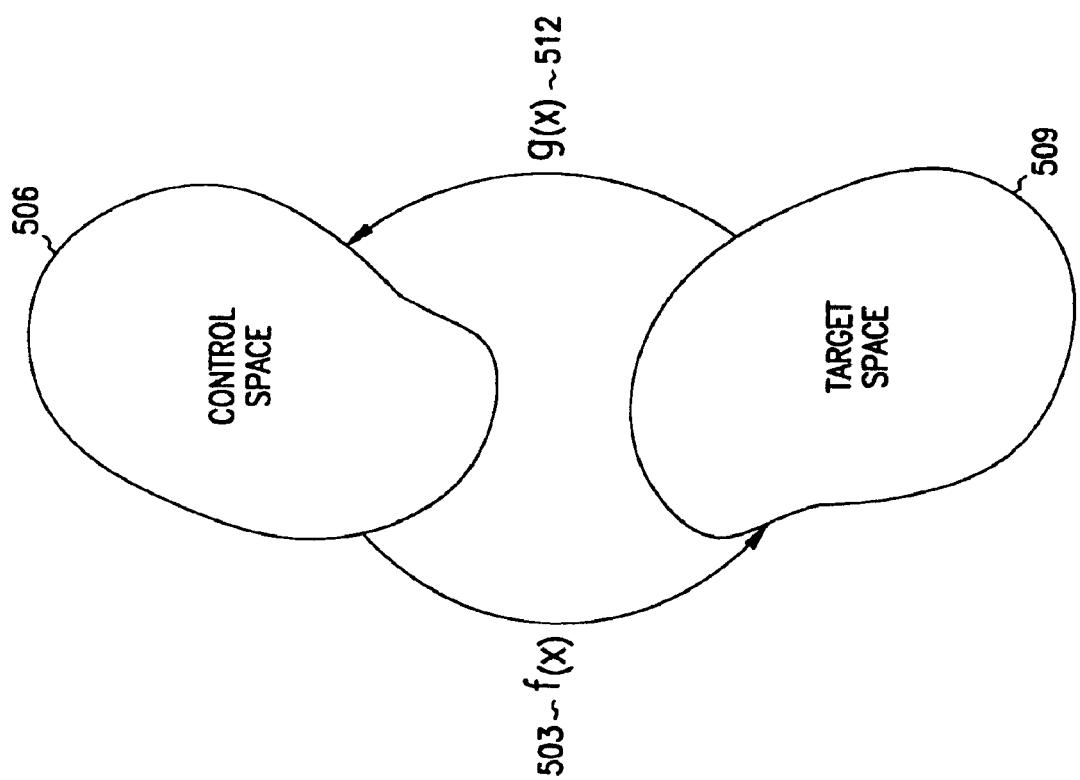
FIG. 5 is a high level diagram of one embodiment of the inverse modeling process shown in FIG. 4.

FIG. 5 is a high level diagram of one embodiment of inverse modeling 419 shown in FIG. 4. A forward model f(x) 503 for mapping a control space 506, such as a CMYK color space, to a target space 509, such as a CIELAB color space is developed. An inverse model g(x) 512 for mapping the target space to the control space is derived from the forward model and various constraints. This method permits the specification of constraints on the desired relationship between K and CMY and on the Total Area Coverage (TAC) limit. This conversion process also produces second gamut 424 from modified gamut 421 as shown in FIG. 4.

Figure 6:
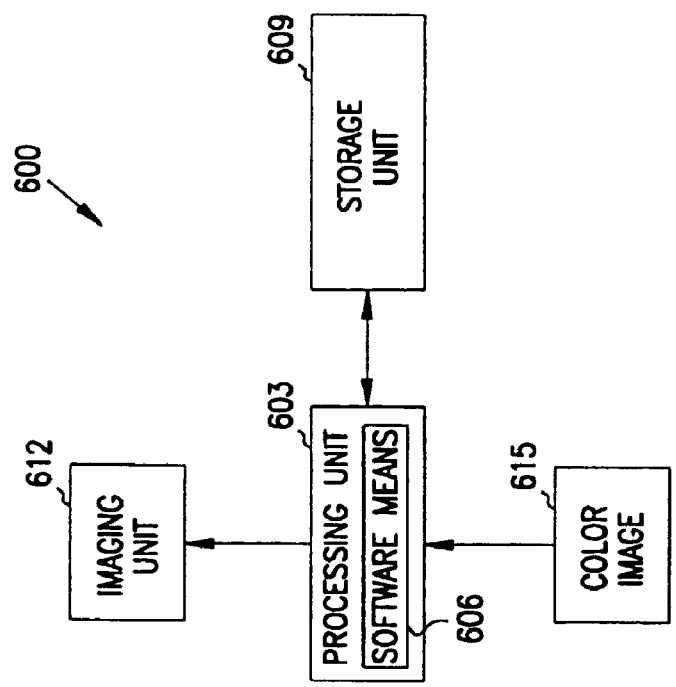
FIG. 6 is a block diagram of example embodiments of an apparatus for transforming a CMY color space gamut into a CMYK color space gamut.

FIG. 6 is a block diagram of example embodiments of apparatus 600 operable for transforming a CMY space gamut into a CMYK space gamut. Apparatus 600 includes processing unit 603, software means 606, storage unit 609, and image forming unit 612. Processing unit 603 is coupled to storage unit 609 and image forming unit 612. Software means 606 is operative on processing unit 603. Color image 615 is an input to processing unit 603.

Processing unit 603 is not limited to a particular type of information processor. Processing units suitable for use in connection with the present invention include microprocessors, mainframe processors, mid-range processors, reduced instruction set processors, complex instruction set processor, parallel processors, and massively parallel processors.

Storage unit 609 is not limited to a particular type of storage unit. In one embodiment, storage unit 609 is a solid state memory. Alternatively, storage unit 609 is a magnetic memory. In still another alternate embodiment, storage unit 609 is an optical memory.

Image forming unit 612 is not limited to a particular type of image forming unit. In one embodiment, image forming unit 612 is a color image forming unit, such as a color ink jet printer, a color laser printer, or an offset printing system. Alternatively, image forming unit 612 is a display device, such as a CRT, a plasma display, or a liquid crystal display. In still another alternate embodiment, image forming unit 612 is an image capture device, such as a color scanner.

Software means 606, in one embodiment, performs the operations of method 100 for black generation using lightness scaling shown in the flow diagram of FIG. 1.

Figure 7:
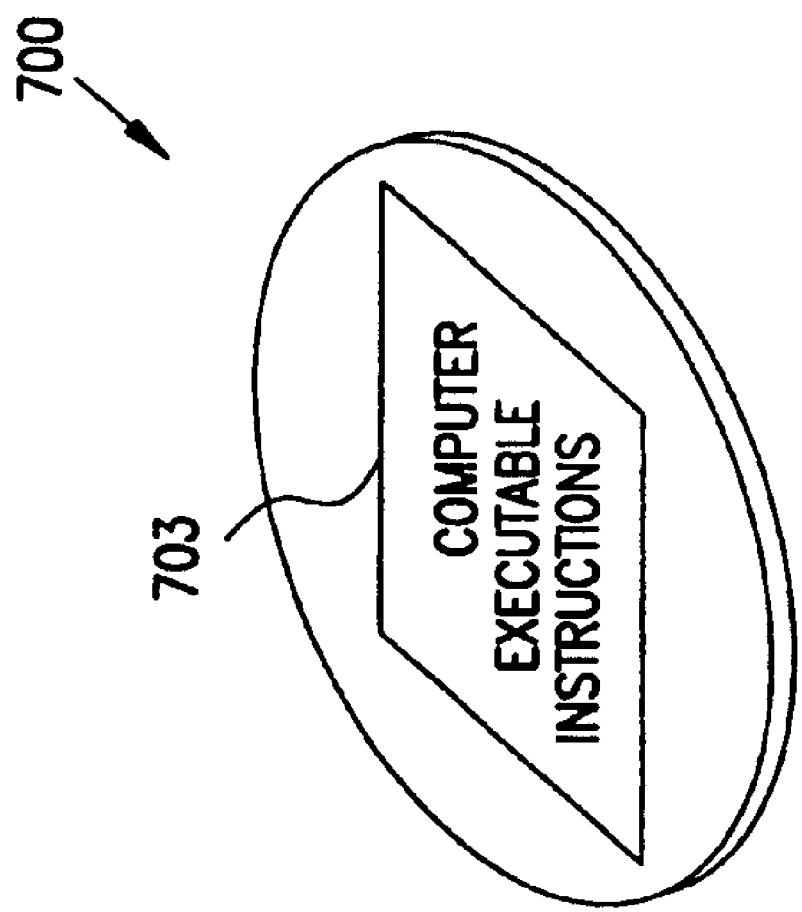
FIG. 7 is a diagram of one embodiment of a computer readable media including computer executable instructions.

FIG. 7 is an illustration of one embodiment of computer-readable medium 700 including computer executable instructions 703. Computer readable medium 700 includes any media capable of storing information, such as magnetic media, optical media, or electronic semiconductor media. Computer executable instructions 703 include instructions for expanding a color gamut, such as could be coded based on the method shown in FIG. 1.

A method and apparatus for expanding a color gamut has been described. The method includes a series of conversions and transformations between color space gamuts which result in expanding and transforming an original color space gamut in such a way that a control space gamut, such as a CMYK space gamut, is more completely utilized.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method, comprising:
   converting a first gamut in a CMY color space to a first gamut in a CMYK color space;
   converting the first gamut in CMYK color space to a gamut in a color space having a lightness component;
   rescaling a lightness component of a gamut value in the color space having a lightness component to form a modified gamut; and
   converting the modified gamut to a second gamut in a CMYK color space;
   wherein said rescaling a lightness component of a gamut value in the color space having a lightness component to form a modified gamut comprises:
   modifying the gamut in the color space having a lightness component by changing a lightness component of a color value in the color space having a lightness component such that an upper surface of the first gamut in the CMY color space is preserved and a lower surface of the first gamut in the CMY color space is mapped to a bottom surface of the gamut of a full CMYK color space to form an expanded gamut in the color space having a lightness component.

2. The method of claim 1, wherein said converting a first gamut in a CMY color space to a first gamut in a CMYK color space comprises:
   applying a black generation method to the gamut in the first CMY color space to form the first gamut in the CMYK color space.

3. A method comprising:
   converting a first gamut in a CMY color space having an upper surface and a lower surface to a first gamut in a CMYK color space;
   converting the first gamut in the CMYK color space to a gamut in a CIELAB color space, the gamut in the CIELAB color space having a lightness component;
   modifying the gamut in the CIELAB color space by changing the lightness component such that the upper surface of the first gamut in the CMY color space is preserved and the lower surface of the first gamut in the CMY color space is mapped to the bottom surface of the gamut of a full CMYK color space to form a gamut in an expanded CIELAB color space; and
   transforming the gamut in the expanded CIELAB color space to form a second gamut in the CMYK color space.

4. The method of claim 3, wherein converting a gamut in a CMY color space having an upper surface and a lower surface to a gamut in a CMYK color space having a bottom surface comprises:
   applying a black generation method to the gamut in the CMY color space to form the first gamut in the CMYK color space.

5. The method of claim 4, wherein applying a black generation method to the gamut in the CMY color space to form the first gamut in the CMYK color space comprises:
   applying Gray Component Replacement (GCR) to the gamut in the CMY color space to form the first gamut in the CMYK color space.

6. The method comprising:
   transforming a CMY space gamut to a first CMYK space gamut by including a black colorant in the CMY space gamut to form the CMYK space gamut;
   transforming the first CMYK space gamut into a CIELAB space gamut by computing the CIELAB space gamut from a model capable of mapping the CMYK space gamut into the CIELAB space gamut;
   changing a lightness component of the CIELAB space gamut to form an enhanced CIELAB space gamut by linearly rescaling the lightness component of the CIELAB space gamut by computing a rescaling factor that is a function of an $L_{min}$, an $L_{max}$, and an $L_{mincmy}$; and
   transforming the enhanced CIELAB space gamut to form a second CMYK space gamut.

7. The method comprising:
   transforming a CMY space gamut to a first CMYK space gamut by including a black colorant in the CMY space gamut;

transforming the first CMYK space gamut into a CIELAB space gamut by printing a plurality of patches and measuring each of the plurality of patches to obtain the CIELAB space gamut;

changing a lightness component of the CIELAB space gamut to form an enhanced CIELAB space gamut by linearly rescaling the lightness component of the CIELAB space gamut by computing a rescaling factor that is a function of an $L_{min}$, an $L_{max}$, and an $L_{mincmy}$; and transforming the enhanced CIELAB space gamut to form a second CMYK space gamut.

* * * * *